June 30, 1925.                     A. F. BLACK                     1,543,978
                                SHOCK ABSORBER
                              Filed Oct. 3, 1923                2 Sheets-Sheet 2

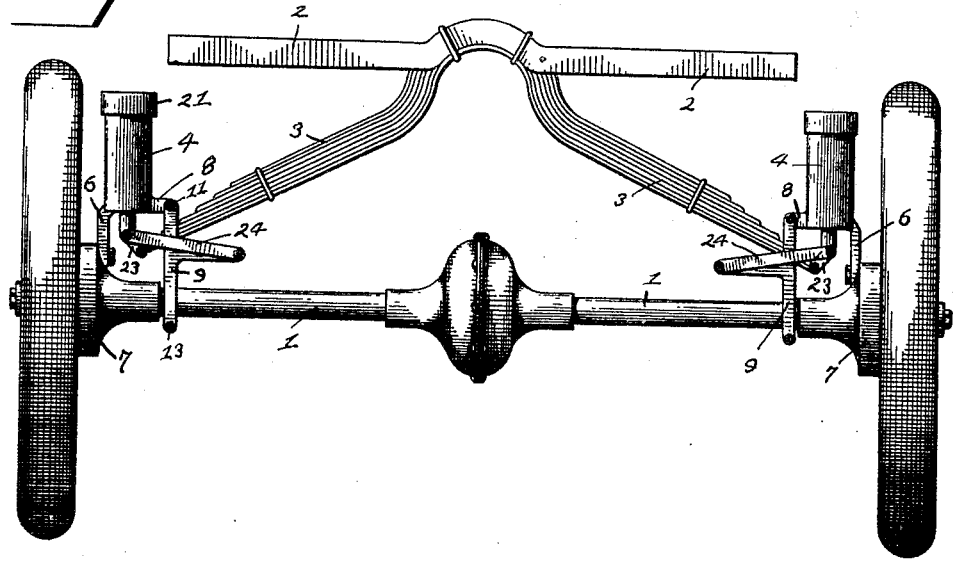
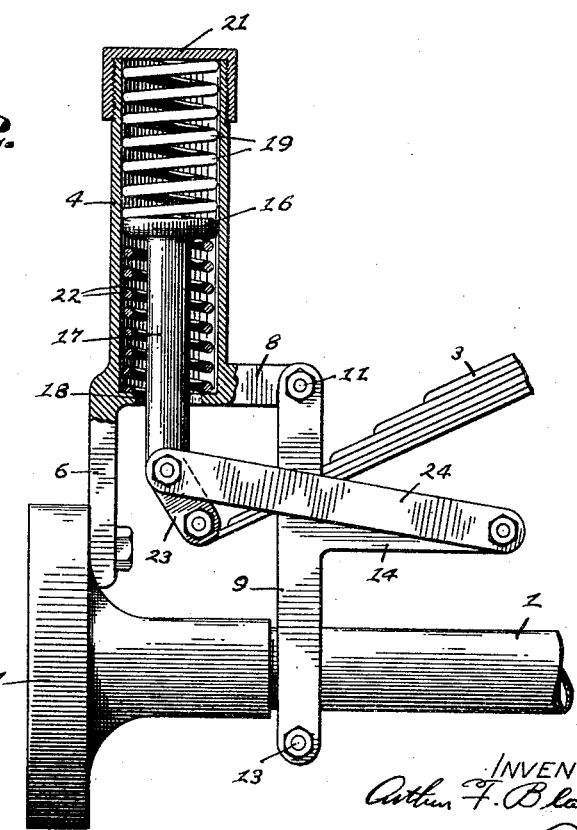

INVENTOR
Arthur F. Black.
BY Arthur L. Slee
ATTY

Patented June 30, 1925.

1,543,978

UNITED STATES PATENT OFFICE.

ARTHUR F. BLACK, OF SELBY, CALIFORNIA.

SHOCK ABSORBER.

Application filed October 3, 1923. Serial No. 666,338.

*To all whom it may concern:*

Be it known that I, ARTHUR F. BLACK, a citizen of the United States, residing in Selby, in the county of Contra Costa and State of California, have invented a new and useful Improvement in a Shock Absorber, of which the following is a specification.

My invention relates to improvements in shock absorbers adapted for connection between the axle and the leaf spring of an automobile to absorb shock and to resiliently support the spring and the weight carried thereby.

My present invention is directed primarily to a device of the character described which is particularly adapted for mounting in connection with the rear axle housings and springs of Ford automobiles and trucks, whereby the absorber may be installed in connection with the standard fittings of the automobile without impairing the normal operation of the spring.

The primary object of my invention is to provide an improved shock absorber adapted to absorb vibration and to increase the resistance and resilience to shock.

Another object is to provide an improved device of the character described embodying improved features of construction and arrangement adapted to facilitate installation and to increase the effectiveness of the springs.

A further object is to provide an improved device of simple and rugged construction which may be manufactured and mounted upon an automobile at a nominal expense.

I accomplish these and other objects by means of the device disclosed in the drawings forming a part of the present specification wherein like characters of reference are used to similar parts throughout said specification and drawings and in which:—

Fig. 1 is a rear elevation of a portion of an automobile showing the manner in which my improved shock absorbers are mounted in connection with the rear axle and spring thereof.

Fig. 2 is a rear elevation, partly in vertical section showing upon a larger scale the manner in which the shock absorber is secured in connection with the axle and spring.

Figure 3:
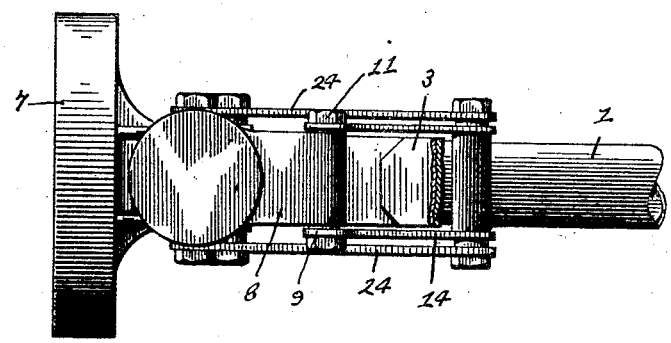
Fig. 3 is a plan view of the device as shown in Fig. 2.
Figure 4:
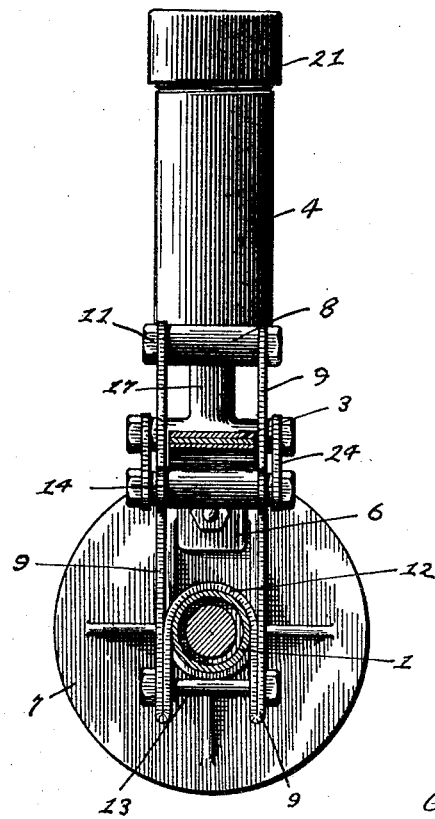
Fig. 4 is a right hand side elevation of the device as shown in Figs. 2 and 3.

Referring to the drawings the numeral 1 is used to designate in general the rear axle housing of a Ford automobile above which the frame 2 and body of the automobile is supported upon a leaf spring 3, the ends of which are normally secured to perches mounted adjacent the ends of the axle in a well known manner.

In my present invention, I replace the usual spring mounting with a resilient mounting consisting of a cylindrical body 4 having a longitudinally disposed extension 6 adapted to be rigidly secured upon the drum at the adjacent end of the axle housing 2 in place of the usual spring perch. A laterally disposed extension 8 is formed upon the body opposite the extension 6. A brace 9 is rigidly secured between the extension 8 and the axle housing 1, the upper end of the brace being secured to the extension 8 by means of a bolt 11 while the opposite end of the brace is bifurcated to form a seat 12 resting upon the axle housing. The ends of the bifurcations are apertured to receive a bolt 13 by means of which the brace is clamped onto the axle housing. A laterally disposed extension 14 is formed upon the brace 9 for a purpose hereinafter more fully explained.

A plunger 16 is slidably mounted within the cylindrical body, said plunger having a stem 17 extending outwardly through an opening 18 in the bottom of the body. A spring 19 is mounted above the plunger between said plunger and a removable cap 21 threaded onto the top of the body 4. A similar spring 22 is mounted below the plunger 16 between said plunger and the bottom of the body. The outwardly extending end of the stem 17 is connected by means of a shackle 23 to the adjacent end of the leaf spring 3, the standard shackle with which the spring is equipped being merely shifted to secure the spring to the stem in place of the usual spring perch.

The edges of the plunger 16 are made spherical and the opening 18 made sufficiently large to permit a slight pivotal movement of the plunger and stem within the body 4. A pair of arms 24 are pivotally connected between the end of the stem 17 and the outer end of the extension 14 which is formed upon the brace 9, said arms serving to hold the plunger and stem in substantial axial alignment with the cylindrical portion of the body 4 when the plunger is moved in either direction against the resistance of the springs 19 and 22.

In operation, shock absorbers are mounted in connection with both ends of the leaf spring 3 and the axle housing as above described. The spring 3 and the weight of the automobile which is normally carried thereon will now be resiliently supported by the plungers 16 and the springs 22. When now any shock is encountered when the automobile is in motion the plunger will first be moved within the body 4 against the resistance of the springs 19 and 22, both of which are normally compressed to a slight degree to maintain the plunger in balanced position within the body 4. The lesser shocks and the ordinary vibration occurring when the automobile is in motion will thus be directed upon the absorber springs and will be taken up without materially flexing the main leaf spring 3. When greater shocks occur the main leaf spring 3 is flexed in the normal manner, the resilience of the absorber spring being added to the resilience of the main leaf spring in absorbing the shock.

After the plunger 16 has been moved downwardly against the resistance of the lower spring 22 by a downward movement of the frame and body of the automobile, the return movement is retarded by the action of the upper springs 19, in this manner slowing down the reaction of the flexed springs and preventing the annoying snap back which commonly occurs.

By connecting the main spring shackle 23 to the stem 17 in place of the rigid spring perch commonly provided, a greater freedom and range of movement is obtained which results in a more effective action of the main spring which is added to the resilience of the absorber springs to give a smoother operation.

The arms 24 move about their pivot mountings to maintain the stems in substantial alignment with the body 4 of the shock absorbers, the slight arcuate movement of the ends of the arms being compensated for by permitting a slight pivotal movement of each plunger and stem within the body. This arrangement is important for the reason that it insures against binding between the stems 17 and any portion of the body, and relieves the body portion of the absorber of any appreciable side thrust.

The absorbers upon opposite side of the automobile may operate independently in opposite directions with respect to the shock absorber springs 19 and 22 which operate to steady the body of the automobile and prevent the side sway which frequently occurs, said springs 19 and 22 combining to resist a downward movement upon either side of the automobile and an upward movement upon the opposite side.

While my invention, as above explained, is intended primarily for use in connection with the rear springs of Ford automobiles, and has been described only in this connection, it is of course subject to modification in various ways to accommodate the device to other types and makes of automobiles. I therefore do not wish to restrict myself to the specific disclosure herein contained, but desire to avail myself of such modifications as may fall within the scope of the appended claims.

Having thus described my invention what I claim as new and desire to secure Letters Patent is:

1. A shock absorber comprising a cylindrical body having an extension formed upon one side thereof and adapted to be rigidly secured upon an axle of an automobile; a brace adapted to be rigidly secured between the axle and an extension formed upon the opposite side of the body, a plunger slidably mounted within the cylindrical body; springs mounted above and below the plunger; a stem connected with the plunger and extending outwardly from the body; means for connecting the outwardly extending end of the stem to the adjacent end of a leaf spring of the automobile whereby said spring and the weight carried thereby are supported above the axle; and a pair of arms pivotally connected between the extension formed upon the brace and the outer end of the stem for guiding the stem and plunger when moved against the resistance of either spring.

2. A shock absorber comprising a cylindrical body having an extension formed upon one side thereof and adapted to be rigidly connected upon the axle of an automobile; a brace having one end thereof rigidly secured to an extension formed upon the opposite side of the body, said brace having a laterally disposed extension and having a seat arranged to be clamped upon the axle; a plunger slidably mounted within the cylindrical body; springs mounted above and below the plunger; a stem connected to the plunger and extending outwardly from the body; means connecting the outwardly extending end of the stem to the adjacent end of a leaf spring of the automobile whereby said spring and the weight carried thereby are supported above the axle; and a pair of arms pivotally connected between the outwardly extending end of the stem and the lateral extension formed upon the brace for guiding the movement of the plunger and stem when moved against the resistance of either spring.

3. A shock comprising a cylindrical body having a longitudinally disposed extension adapted to be rigidly secured upon an axle of an automobile and also having a laterally disposed extension upon the side opposite the first mentioned extension; a brace rigidly secured between the lateral extension and the axle, said brace being provided with a laterally disposed extension and having a seat formed by bifurcations adapted to be clamped around the axle; a plunger slidably mounted within the cylindrical body; springs mounted above and below the plunger; a stem connected to the plunger and extending outwardly through the bottom of the body; means connecting the outwardly extending end of the stem to the adjacent end of a leaf spring of the automobile whereby the spring and the weight carried thereby are supported above the axle; and means pivotally connected between the outwardly extending end of the stem and the lateral extension of the brace for guiding the stem and plunger when moved against the resistance of either spring.

4. A shock absorber comprising a cylindrical body having a longitudinally disposed extension adapted to be rigidly secured upon an axle of an automobile and also a laterally disposed extension formed upon the side opposite the first mentioned extension; a brace rigidly secured between the lateral extension and the axle, said brace being provided with a laterally disposed extension and having a seat formed by bifurcations adapted to be clamped around the axle; a plunger slidably mounted within the cylindrical body, said plunger having spherical edges adapted to permit a slight pivotal movement of the plunger within the body; springs mounted above and below the plunger; a stem connected to the plunger and extending outwardly from the body; means connecting the outwardly extending end of the stem to the end of a leaf spring of the automobile whereby said spring and the weight carried thereby are supported above the axle; and a pair of arms pivotally connected between the outwardly extending end of the stem and the lateral extension of the brace for guiding the stem and plunger when moved against the resistance of either spring.

In witness whereof I hereunto set my signature.

ARTHUR F. BLACK.